United States Patent
Jung et al.

(10) Patent No.: US 7,430,889 B2
(45) Date of Patent: Oct. 7, 2008

(54) DEVICE FOR FORMING PROTRUDING PARTS ON THE CARRIER PLATE OF A BRAKE-LINING

(75) Inventors: Friedrich H. Jung, Waldbrunn-Ellar (DE); Alexander Jung, Diez (DE); Friedrich Schlitt, Hadamar-Steinbach (DE)

(73) Assignees: METEK Metallverarbeitungs Gesellschaft GmbH, Meckenheim (DE); TMD Friction Europe GmbH, Leverkusen (DE)

( * ) Notice: Subject to any disclaimer, the term of this patent is extended or adjusted under 35 U.S.C. 154(b) by 223 days.

(21) Appl. No.: 10/560,417

(22) PCT Filed: Jun. 16, 2004

(86) PCT No.: PCT/EP2004/006462

§ 371 (c)(1),
(2), (4) Date: Apr. 7, 2006

(87) PCT Pub. No.: WO2004/113004

PCT Pub. Date: Dec. 29, 2004

(65) Prior Publication Data
US 2006/0243017 A1  Nov. 2, 2006

(30) Foreign Application Priority Data
Jun. 16, 2003  (DE) .............................. 103 26 962

(51) Int. Cl.
*B21D 31/02*  (2006.01)
(52) U.S. Cl. ........................ 72/325; 72/452.9
(58) Field of Classification Search ............ 72/325, 72/326, 452.9; 76/13, 19, 21, 24.5
See application file for complete search history.

(56) References Cited
U.S. PATENT DOCUMENTS 649,762 A  5/1900  Saltzkorn et al.

(Continued)

FOREIGN PATENT DOCUMENTS

CA  263871  8/1926

(Continued)

*Primary Examiner*—Daniel C Crane

(57) ABSTRACT

The inventive device makes it possible to form protruding parts (18) teeth, spigots, corrugations and the similar on a carrier plate (8) of a brake-lining by introducing a tool into said carrier plate (8) of a brake-lining with the aid of a pressure plate (1) and by removing the tool from the plate. The tool consists of a number of elements (68 to 71) which are displaceable in an opposite direction towards each other and provided with cutting teeth, for example with a saw blade. During formation of protruding parts, the elements (68 to 71) of the tool are displaceable on a plane along two axes, i.e., along the first axis (20) and along the second axis (21) which is perpendicular to the first axis which coincides or is aligned essentially in a perpendicular direction with respect to the surface of the carrier plate (8) of a brake-lining. The inventive device also comprises forced guiding means which displace the elements (68 to 71) of the tool in the direction of the second axis, are arranged between the pressure plate (1) and the elements (68 to 71) of the tool and ensure a forced motion in the direction of the first axis (20. The guiding means also comprise a wedge slider (64) and a guide slider (52) provided with corresponding inclined surfaces (65, 66). A method for simultaneously machining two carrier plates of a brake lining is also disclosed.

16 Claims, 7 Drawing Sheets

U.S. PATENT DOCUMENTS

Figure 1:
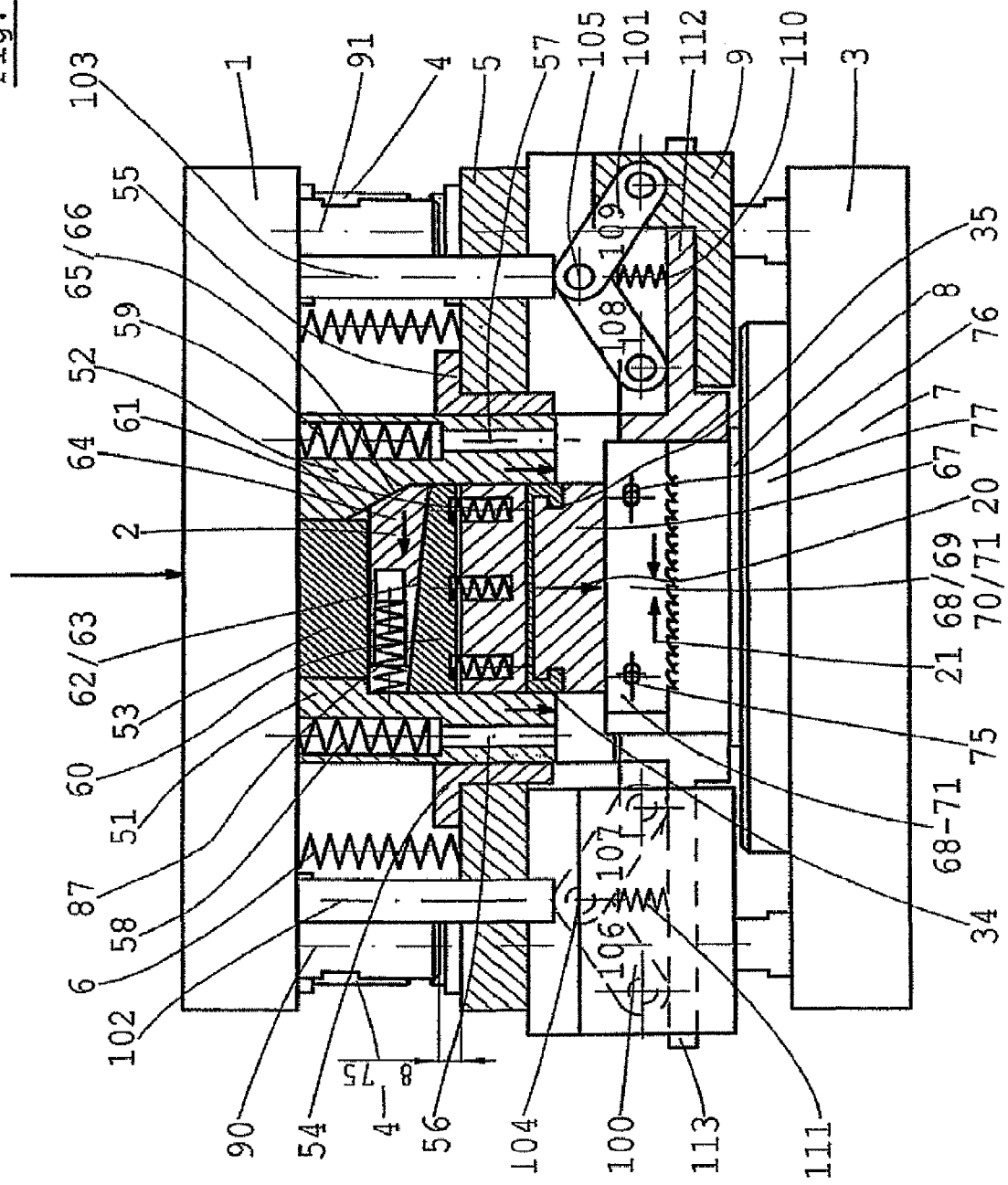

| | | |
|---|---|---|
| 1,044,283 A | 11/1912 | Stanger |
| 3,557,407 A | 1/1971 | Lemelson |
| 3,886,639 A * | 6/1975 | Pastemak ..................... 72/325 |
| 4,005,991 A | 2/1977 | Uebayasi et al. |
| 4,569,424 A | 2/1986 | Taylor, Jr. |
| 4,799,579 A | 1/1989 | Myers et al. |
| 5,376,410 A | 12/1994 | MacKelvie |
| 6,431,331 B1 | 8/2002 | Arbesman |
| 6,464,047 B1 | 10/2002 | Arbesman |
| 6,644,089 B1 * | 11/2003 | Gorgen ..................... 72/452.9 |
| 6,843,095 B2 | 1/2005 | Arbesman |
| 6,910,255 B2 | 6/2005 | Arbesman |
| 7,048,097 B2 | 5/2006 | Arbesman et al. |

FOREIGN PATENT DOCUMENTS

| | | |
|---|---|---|
| CA | 311275 | 5/1931 |
| CA | 1330521 | 7/1994 |
| CA | 1337622 | 11/1995 |
| DE | 103 26 962 B3 | 11/2004 |
| DE | 103 47 409 A1 | 5/2005 |
| EP | 1 484 524 A1 | 12/2004 |
| GB | 2 245 667 A | 8/1992 |
| WO | WO-00/49308 | 8/2000 |
| WO | WO-03/081075 A1 | 10/2003 |

* cited by examiner

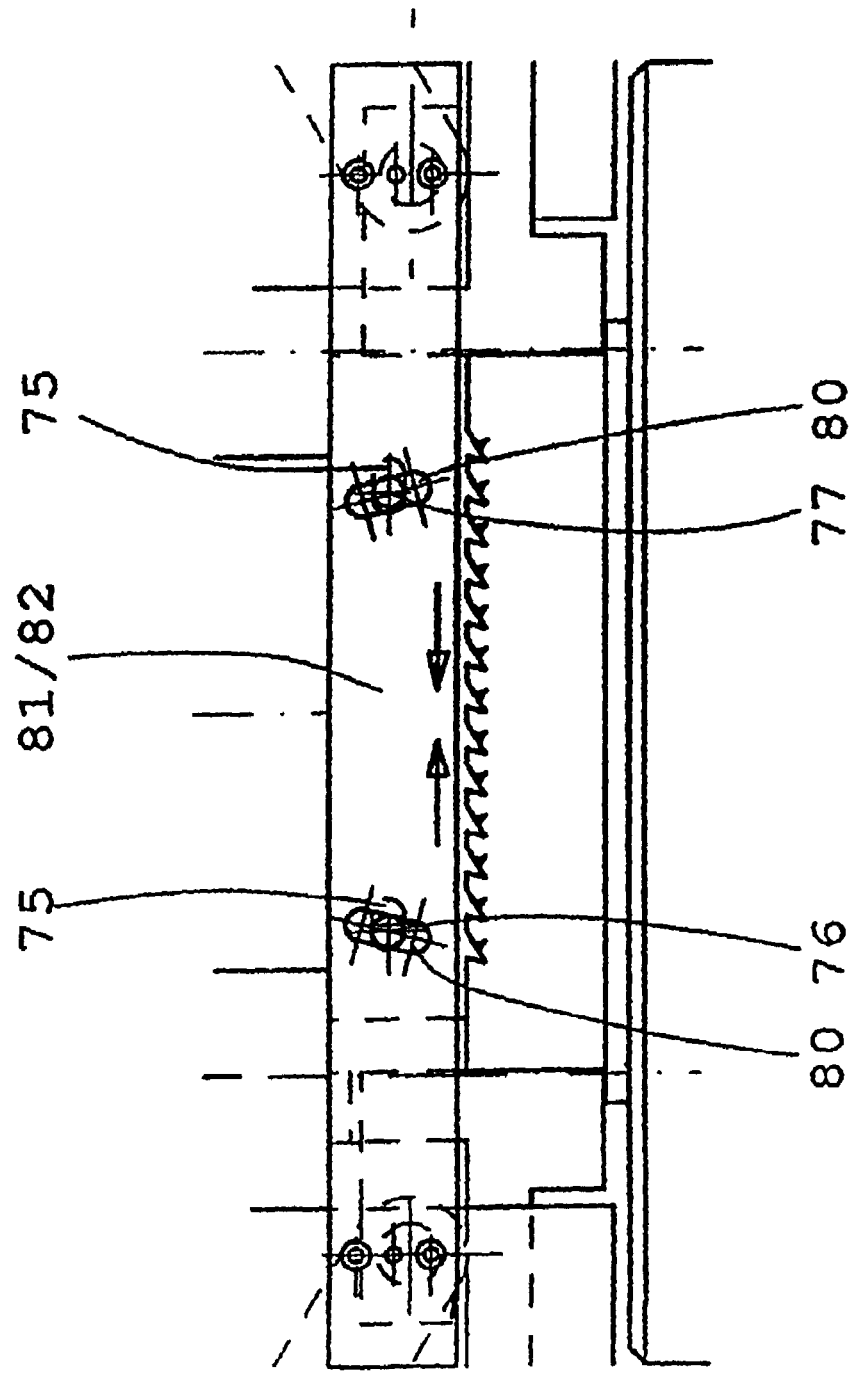

DEVICE FOR FORMING PROTRUDING PARTS ON THE CARRIER PLATE OF A BRAKE-LINING

This application is a 371 of PCT/EP04/06462, filed Jun. 16, 2004.

The invention relates to a crimping device for creating protruding teeth, burrs, crimps or the like on the carrier plate of a brake lining, whereby a tool is driven by means of a compression plate into the carrier plate of the brake lining and subsequently removed from it again, said tool consisting of a number of tool elements that can be adjusted in opposite directions relative to each other and that have cutting teeth, for example, saw tool elements, and during the crimping process, the tool elements are moved in a plane along two axes, i.e. in a first axis and in a second axis perpendicular thereto, whereby the first axis essentially corresponds to a face normal of the carrier plate of the brake lining, and positive guiding means are provided for moving the tool elements in the direction of the second axis.

The invention also relates to a carrier plate of a brake lining produced with such a device as well as to a method for creating protruding teeth, burrs, crimps and the like on the carrier plate of a brake lining.

Such a crimping device is already known from WO 00/49308. Here, the tools are moved in the direction of the second axis by means of the interaction of the wedge surfaces of a gliding slider and of a working carriage during the actual creation of the projections, teeth, burrs or the like. The movement of the tools in the direction of the first axis is effectuated by means of a machining mechanism fitted with adjusting springs. These adjusting springs are supposed to contribute to making it possible to mount the device on various presses with different force specifications, whereby it is to be ensured that a constant force acts on the tools, irrespective of the pressure exerted by the press. The return of the tools once the projections have been created is effectuated by pre-tensioning a spring. A drawback with this device has turned out to be that there is a risk that created projections, teeth, burrs or the like might be broken off by the tool, especially when the tool is removed from the machined carrier plate of the brake lining.

U.S. Pat. No. 3,557,407 discloses a device as well as a method for crimping or for creating projections and corresponding indentations in a metal plate in which two cooperating rollers are provided, between which the metal plate is fed. The outer surface of one of the rollers is provided with a plurality of elements such as sharp wedge-shaped teeth that are driven into the surface of the metal plate when it is fed through. In this manner, the metal plate is roughened up or teeth are formed on its surface when corresponding burrs or teeth are created on the surface of the metal plate.

CA 133 76 22 discloses the technique of moving adjacently arranged tool elements having cutting teeth in opposite directions by exerting pressure so that the teeth create burrs and carve furrows on the material of a plate. Here, it is provided that an element under pressure advances into a curved recess of the tools that are arranged so as to be slightly offset with respect to each other, especially saw blades or the like and, by moving along the curve of this curved recess, said element controls a horizontal movement as well as a lowering of the saw blades towards the plate that is to be machined.

Before this backdrop, the present invention is based on the objective of providing an improved crimping device having the above-mentioned features which ensures a reproducible creation of the protruding projections, teeth, burrs or the like on the carrier plate of the brake lining and which prevents these protruding projections from breaking off when the tool is removed.

This objective is achieved by the crimping device having the above-mentioned features essentially in that additional positive guiding means are arranged between the compression plate and the tool or tool elements, said positive guiding means comprising a wedge slider and a guide slider with corresponding slanted surfaces that effectuate a positively guided movement of the tool elements in the direction of the first axis.

Owing to these measures, a positively guided movement of the tool can be effectuated in two axes in a plane so as to allow, first of all, a defined crimping of the carrier plate of the brake lining and secondly, also a defined removal of the tools from the carrier plate of the brake lining, without the risk that the crimps or the protruding teeth, burrs or the like might break off.

According to a first advantageous embodiment of the invention, it is provided that a spacer is arranged between the compression plate and the wedge slider.

Moreover, it is practical for the guide slider to extend through a pressure plate and to be guided in said pressure plate by means of a guide element.

In another advantageous embodiment of the invention, a spring-loaded hold-down device is arranged in the guide slider, with which the already machined carrier plate of the brake lining can be held down while the tool is being removed.

It is also practical for the wedge slider to rest via a wedge piece on the pressure plate, whereby the inclines of the wedge slider and of the wedge piece correspond to each other.

In another advantageous embodiment, the wedge slider is pre-tensioned by means of a pressure spring that rests on the second guide slider.

According to the invention, the wedge piece can be suspended in the pressure plate and can rest on it by means of a pressure spring.

Advantageously, on a section that passes through the pressure plate, the wedge piece has a receptacle for a tool carrier receptacle for the tool elements.

Furthermore, it is provided that the tool elements have elongated holes arranged in the direction of the second axis through which especially detachable holding pins of the tool carrier receptacle extend. First of all, this allows an easier replacement of the tool elements once they are worn out. Secondly, this measure makes it possible for adjacent tool elements to move in opposite directions with respect to each other.

The holding pins can be positioned in elongated holes arranged at an angle relative to the first and/or second axes, said elongated holes being arranged in faceplates that are securely connected to the guide sliders.

In an independent embodiment of the invention, it is especially advantageous for the positive guiding means to be formed by toggle mechanisms arranged on both sides of the tool elements that, when the compression plate is lowered, move adjacent tool elements in opposite directions with respect to each other.

Here, it is practical for the toggle mechanisms to be actuated by means of actuation rods of the press plate that are positioned in the direction of the first axis and that act on toggle links.

It is also provided that the toggle mechanisms have levers that can be spread so as to counter the pre-tensioning of spring elements.

Advantageously, outer levers are connected in an articulated manner to a guide housing and inner levers are connected in an articulated manner to slide elements, whereby the slide elements act on the outside of the tool elements.

Advantageously, during one work cycle, each of the tool elements executes a positively guided, biaxial, swinging or pivoting back-and-forth movement in the plane essentially perpendicular to the carrier plate of the brake lining when the compression plate is lowered and raised.

Moreover, two tools are provided with tool elements that are at a lateral distance from each other.

The invention also relates to a carrier plate of a brake lining having protruding teeth, burrs, crimps and the like that is made by means of the above-mentioned crimping device.

Finally, the invention also relates to a method for crimping carrier plates of brake linings by means of a device having two tools, whereby during each cycle, one half of each of the two carrier plates of a brake lining is machined together. The two carrier plates of the brake lining that are to be machined at the same time can be situated, for example, on a turntable and, after the first machining step, can be moved into the next machining position by rotating the turntable, so that then the second section of each carrier plate of the brake lining can be machined.

Additional advantages, embodiments and application possibilities of the present invention can be gleaned from the description of an embodiment below, making reference to the drawing.

Figure 2:
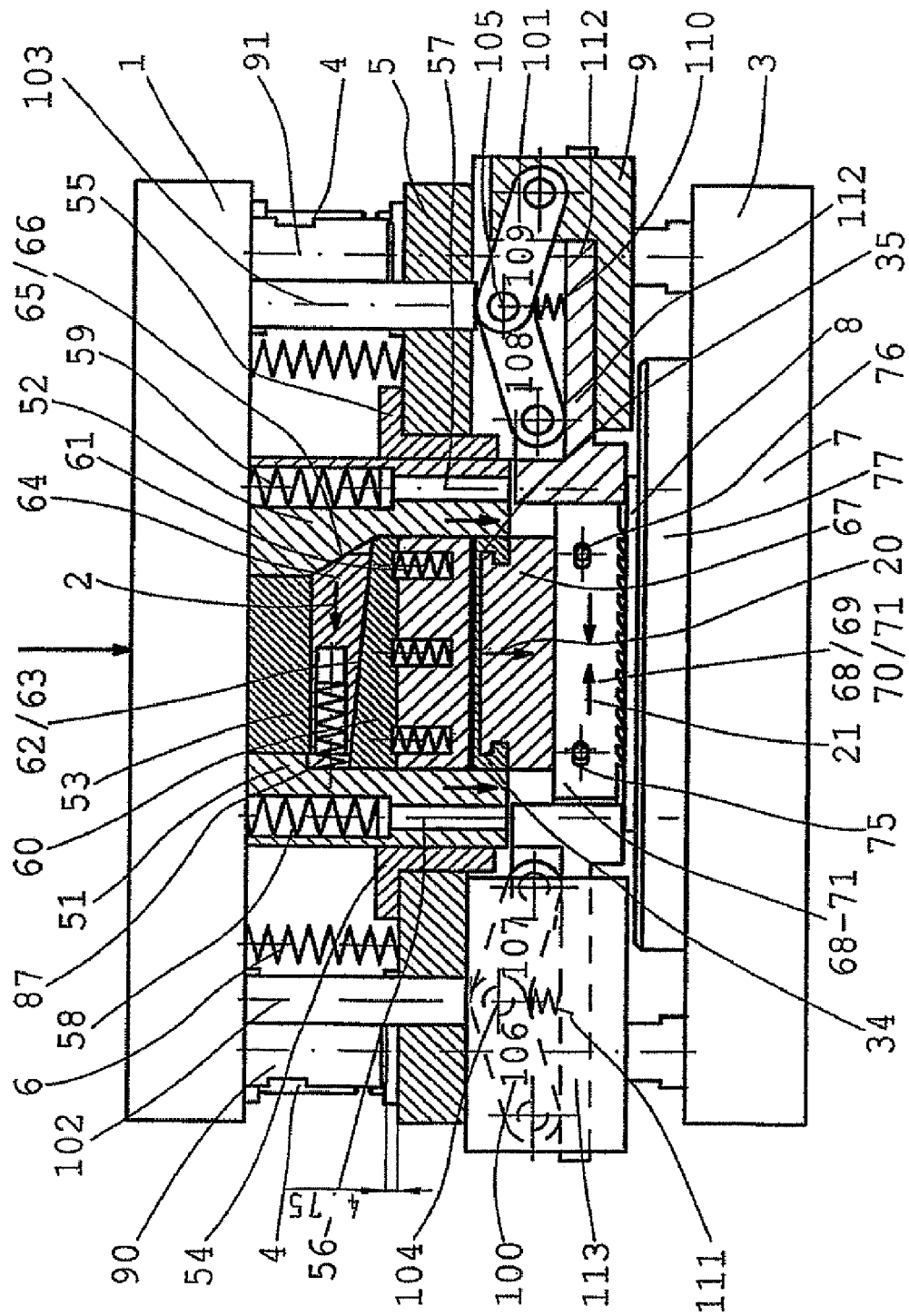
Figure 3:
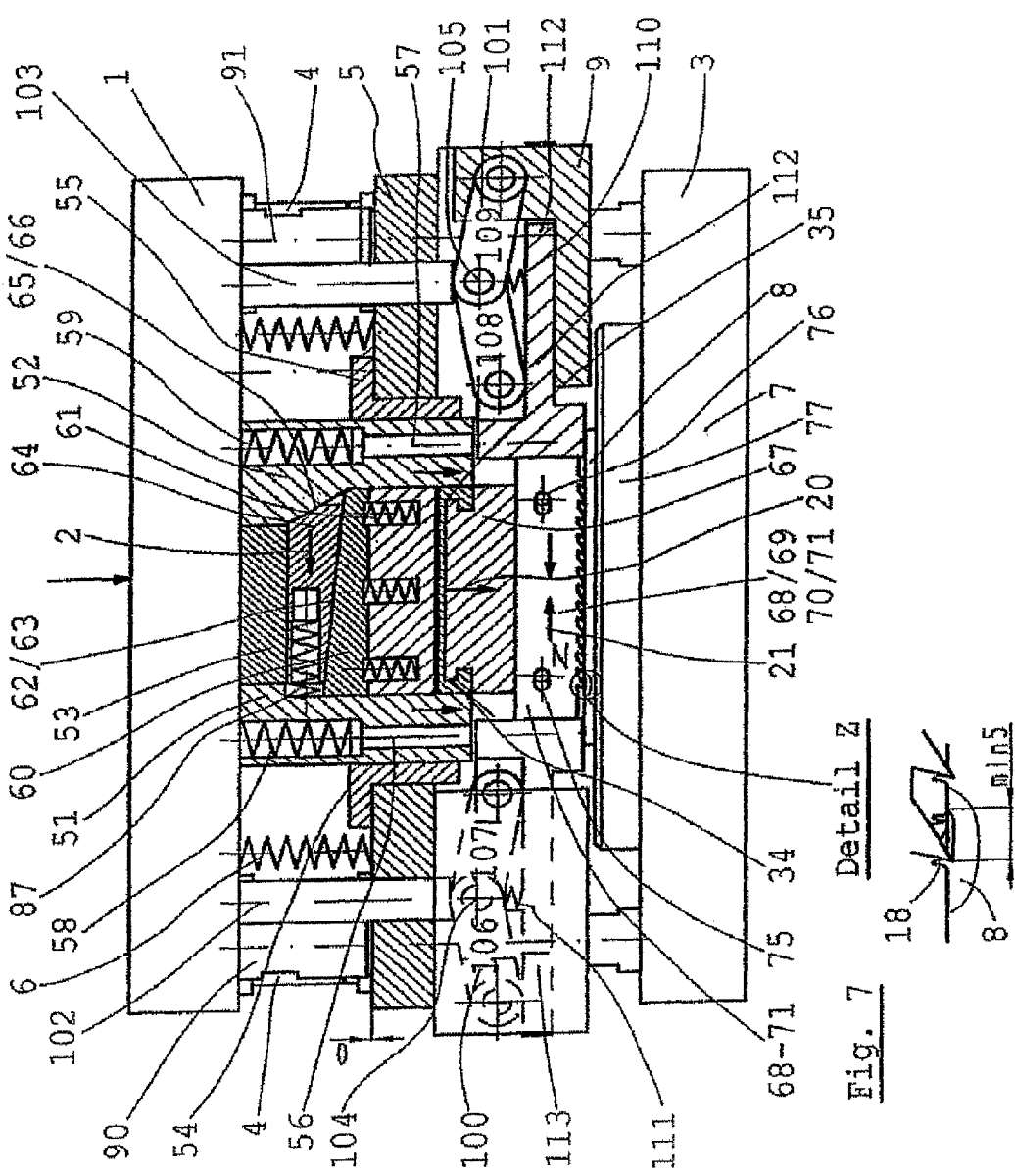
Figure 4:
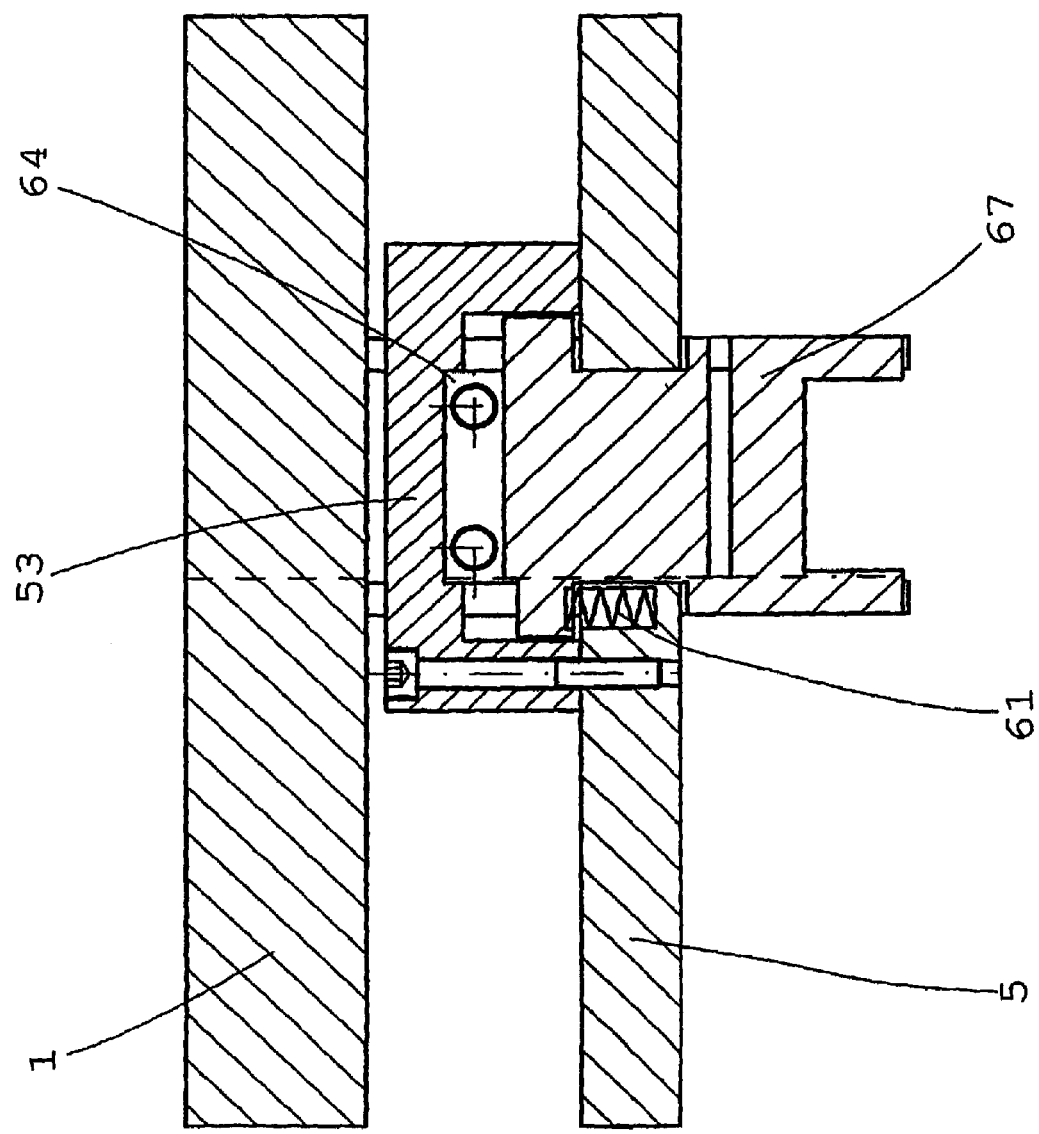
Figure 5:
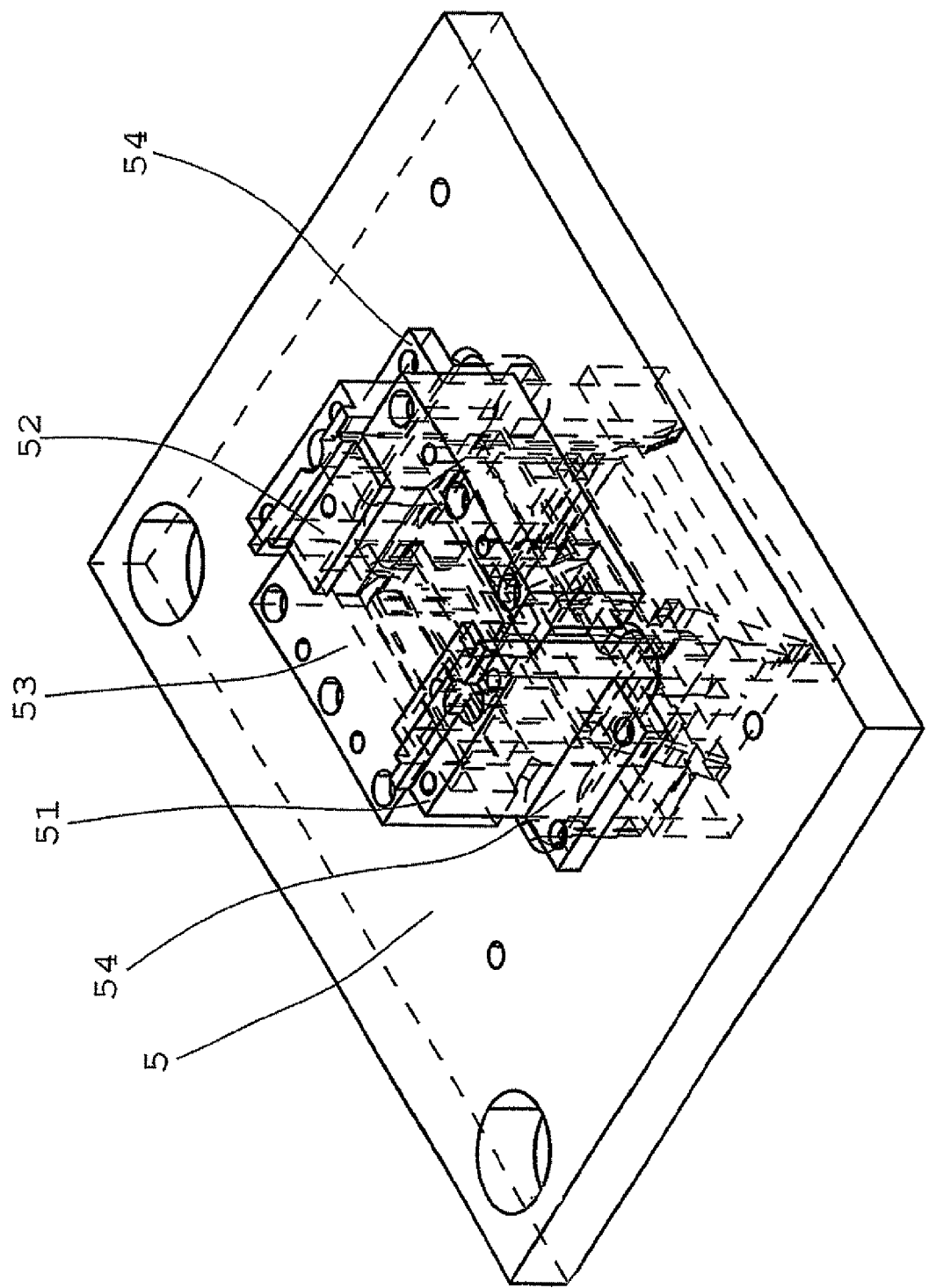
Figure 6:
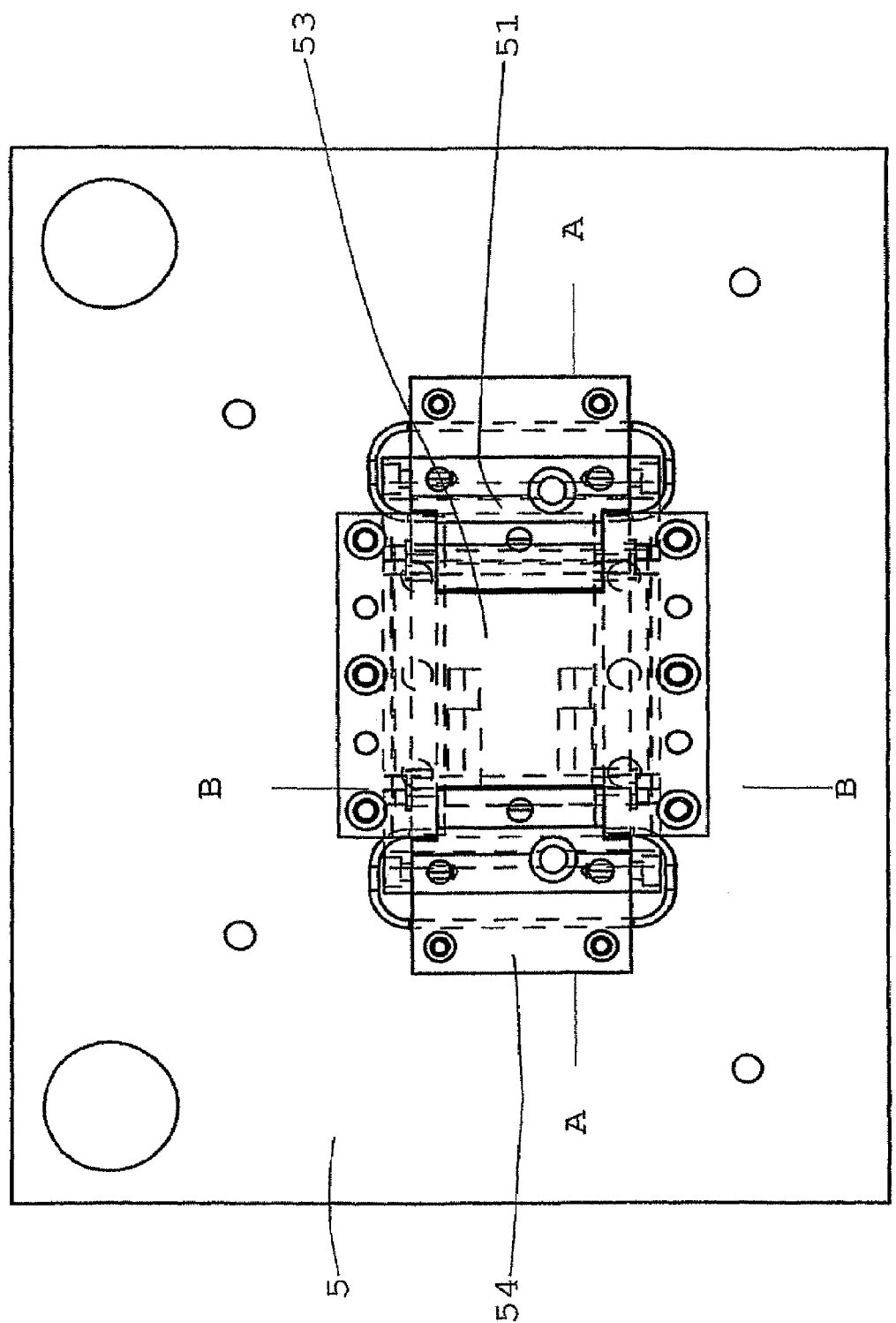

The drawing shows the following:

FIGS. 1 to 3 an embodiment of a device according to the invention in an upper position of the compression plate, in a middle position of the compression plate and in a lower final position of the compression plate, FIG. 4 a sectional view through the device of FIG. 1 in the area of the positive guiding means, FIG. 5 a perspective view of the device after the compression plate has been removed, FIG. 6 a top view of the device according to the invention after the compression plate has been removed, FIG. 7 a detailed view Z of FIG. 3 and FIG. 8 a section of the device according to FIGS. 1 to 3 in the area of the tools.

The device for crimping carrier plates 8 of brake linings is described with reference to the accompanying drawings in FIGS. 1 to 7.

The tool for the production of the surface roughening or for creating teeth on the surface of carrier plates 8 of brake linings comprises a compression plate 1 on which two guide sliders 51, 52 are arranged at a distance from each other with a spacer 53 positioned between them. The two guide sliders 51, 52 extend through a pressure plate 5. Guide elements 54, 55 are provided for guiding the two guide sliders 51, 52.

Hold-down devices 56, 57 that are spring-loaded by pressure springs 58, 59 are arranged in the two guide sliders 51, 52, said hold-down devices holding down the carrier plate 8 of the brake lining when the tool is lifted off the carrier plate 8 of the brake lining that has just been machined.

A wedge piece 60 is suspended in the pressure plate 5 and it rests on the pressure plate 5 by means of the pressure spring 61 on the one hand and towards the top, lies via a wedge incline 62 on a corresponding wedge incline 63 of a slider 64.

The slider 64 is mounted on the spacer 53 so as to move in the direction of the arrow 2 and, at the same time, it is held by a housing arranged on the spacer 53.

On its one face, the slider 64 has a shaped incline 65 that lies on a corresponding inclined guide 66 of the one guide slider 52. Here, the slider 64 is pressed against this inclined surface 66 of the one guide slider 52 by means of a pressure spring 67 that rests on the opposite guide slider 51.

The lower end of the wedge piece 60 that passes through the pressure plate 5 has a receptacle for a tool receptacle 67. The receptacle for the tool receptacle 67 has two grooves 34, 35 into which the tool carrier receptacle 67 is inserted.

The individual tools in the form of saw blades 68, 69, 70, 71 are held in the U-shaped tool carrier receptacle 67, whereby elongated holes 75 are arranged in the saw blades through which holding pins 76, 77 of the tool carrier receptacle 67 extend as is shown in FIG. 8. These holding pins are detachable so that the saw blades 68 through 71 can be replaced.

The holding pins 76 that extend through the elongated holes 75 also extend through elongated holes 80 that are arranged at a slant on faceplates 81, 82 that are firmly connected to the guide sliders 51, 52. Owing to this slanted arrangement of the elongated holes 80, a positive guidance of the tools 68 through 71 is achieved when the tool carrier receptacle or the tools are lifted off the workpiece that has just been machined, so that the tools 68 through 71 are moved into the position they had before the machining.

The mode of operation of the device will be described below.

Starting from an initial position of the compression plate 1 according to FIG. 1, the tool carrier receptacle 67 with the tools 68 through 71 is in a raised position above the carrier plate 8 of the brake lining that is to be machined. When pressure is now exerted onto the compression plate 1, the compression plate 1 is moved together with the pressure plate 5 along the columns 4 downwards in the direction of the workpiece 8 that is to be machined. In this process, the pressure spring 6 is compressed by a certain amount that corresponds to the frictional force of the pressure plate 5 against the columns 4. The pressure springs 6 bring about a certain attenuation when, during the lowering movement, the tools 68 through 71 come to rest on the workpiece 8 that is to be machined and the compression plate 1 strikes the pressure plate 5 via stops 90, 91.

Further lowering the compression plate 1 now causes the slider 64 with its shaped incline 65 on the front to glide lengthwise along the inclined guide 66 of the guide slider 52, namely, in the direction of the arrow as shown in FIG. 2. As a result, the tool carrier receptacle 67 with the tools 68 through 71 is lowered in the direction of the workpiece 8 that is to be machined, while the teeth dig into the workpiece. Toggle mechanisms 100, 101 are located on both sides of the saw blades 68 through 71 and, when the compression plate 1 is lowered, said toggle mechanisms 100, 101 move the saw blades 68 through 71 in opposite directions with respect to each other as can be seen in FIG. 3. This takes place in that vertical actuation rods 102, 103 are arranged on the compression plate I and they act on the toggle link 104, 105, thereby spreading the two levers 106, 107 and 108, 109 against the force of a spring element 110, 111. The lever 107 or 108 that faces inwards in each case is connected in an articulated manner to the slide elements 112, 113 that move the tools 68 through 71 with respect to each other in the horizontal direction. The levers 106, 109 that face outwards are connected in an articulated manner to a guide housing 9. These two movements, that is to say, the lowering movement of the tools by means of the downward compressive force of the slider 64 and the horizontal movement of the blades by means of the sliders 112, 113, are superimposed and bring about the crimping of the workpiece.

By lifting the compression plate 1, the hold-down devices 102, 103 are activated, as a result of which the already machined workpiece is held on the receptacle 7.

When the compression plate 1 is lifted, the actuation rods 102, 103 also travel upwards into the openings of the housing 5, as a result of which the levers 106, 107 and 108, 109 swivel towards each other. As a result, the sliders 112, 113 are moved back into their starting position. Therefore, the crimps or projections 18 that have just been created are not broken off.

When the slider 64 is slid during the lowering movement of the compression plate 1, the pressure piece 60 is pressed against the force of the pressure springs 61. These pressure springs 61 also cause the shaped incline 65 on the front of the slider 64 to come to lie against the inclined surface 66.

FIG. 7, a sectional enlargement of the detail Z from FIG. 3, shows how the projections 18, teeth, crimps or the like are created on the carrier plate 8 of the brake lining by means of the tool elements 68 through 71. Moreover, it is evident that an adjacent blade creates the projections 18 by means of an opposing movement.

Another embodiment of the invention consists of arranging two tools at a lateral distance from each other for the carrier plates of the brake linings of trucks, whereby during one work cycle, one half of each of the two carrier plates 8 of the brake linings are machined together.

LIST OF REFERENCE NUMERALS 1 compression plate
2 direction of arrow
4 column
5 pressure plate
6 pressure spring
8 carrier plate of the brake lining
9 guide housing
18 projection, pin, tooth, crimp
20 first axis
21 second axis
34 grooves
35 grooves
51 guide slider
52 guide slider
53 spacer
54 guide element
55 guide element
56 hold-down device
57 hold-down device
58 pressure spring
59 pressure spring
60 wedge piece
61 pressure spring
62 wedge incline
63 wedge incline
64 slider
65 shaped incline
66 inclined guide
67 tool receptacle
68 saw blade
69 saw blade
70 saw blade
71 saw blade
75 elongated holes
76 holding pins
80 elongated holes
81 faceplates
82 faceplates
87 pressure spring
90 stop
91 stop
100 toggle mechanism
101 toggle mechanism
102 actuation rod
103 actuation rod
104 toggle link
105 toggle link
106 lever
107 lever
108 lever
109 lever
110 spring element
111 spring element
112 slide element
113 slide element

The invention claimed is:

1. A crimping device for creating protruding projections (18), such as teeth, burrs, crimps on a carrier plate (8) of a brake lining, comprising:
a tool that is driven by a compression plate (1) into the carrier plate (8) of the brake lining and subsequently removed from it again, said tool comprising a number of tool elements (68, 69, 70, 71) that can be adjusted in opposite directions relative to each other and that have cutting teeth, and wherein the tool elements (68 to 71) are moved in a plane both along a first axis (20) and a second axis (21) substantially perpendicular thereto to create protruding projections, wherein the first axis (20) essentially corresponds to or lies flush with a face normal of the carrier plate (8) of the brake lining, and wherein said tool further comprises positive guiding means for moving the tool elements (68 to 71) in the direction of the second axis, wherein the positive guiding means are arranged between the compression plate (1) and the tool elements (68, 71), said positive guiding means comprising a wedge slider (64) and a guide slider (52) with corresponding slanted surfaces (65, 66) that are configured for a positively guided movement of the tool elements (68 to 71) in the direction of the first axis (20).

2. The device according to claim 1, characterized in that a spacer (53) is arranged between the compression plate (1) and the wedge slider (64).

3. The device according to claim 1, characterized in that the guide slider (52) extends through a pressure plate (5) and is guided in said pressure plate (5) by means of a guide element (55).

4. The device according to claim 1, characterized in that a hold-down device (57) that is spring-loaded by a pressure spring (59) is arranged in the guide slider (52).

5. The device according to claim 1, characterized in that the wedge piece (60) is suspended in the pressure plate (5) and rests on the pressure plate by means of a pressure spring (61).

6. The device according to claim 1, characterized in that, on a section that passes through the pressure plate (5), the wedge piece (60) has a receptacle for a tool carrier receptacle (67) for the tool elements (68 to 71).

7. The device according to claim 1, characterized in that the tool elements (68 to 71) have elongated holes (75) arranged in the direction of the second axis through which especially detachable holding pins (76) of the tool carrier receptacle (77) extend.

8. The device according to claim 1, characterized in that the positive guiding means are formed by toggle mechanisms (100, 101) arranged on both sides of the tool elements (68 to 72) that, when the compression plate (1) is lowered, move adjacent tool elements (68 to 72) in opposite directions with respect to each other.

9. The device according to claim 8, characterized in that the toggle mechanisms (100, 101) are actuated by means of actuation rods (102, 103) of the compression plate (1) that are positioned in the direction of the first axis (200) and that act on the toggle links (104, 105).

10. The device according to claim 8, characterized in that the toggle mechanisms (100, 101) have levers (106, 107 and 108, 109) and associated spring elements (110, 111), and the levers can be spread so as to counter pre-tensioning of the spring elements (110, 111).

11. The device according to claim 10, characterized in that the levers (106, 109) are connected in an articulated manner to a guide housing (9) and the levers (107, 108) are connected in an articulated manner to slide elements (112, 113), whereby the slide elements (112, 113) act on the outside of the tool elements (68 to 72).

12. The device according to claim 1, characterized in that during one work cycle, each of the tool elements (68 to 71) executes a positively guided, biaxial, swinging or pivoting back-and-forth movement in the plane essentially perpendicular to the carrier plate (8) of the brake lining when the compression plate (1) is lowered and raised.

13. The device according to claim 1, characterized in that two tools are provided with tool elements (68 to 72) that are at a lateral distance from each other.

14. A crimping device for creating protruding projections (18), such as teeth, burrs, crimps on a carrier plate (8) of a brake lining, comprising:
a tool that is driven by a compression plate (1) into the carrier plate (8) of the brake lining and subsequently removed from it again, said tool comprising a number of tool elements (68, 69, 70, 71) that can be adjusted in opposite directions relative to each other and that have cutting teeth, and wherein the tool elements (68 to 71) are moved in a plane both along a first axis (20) and a second axis (21) substantially perpendicular thereto to create protruding projections, wherein the first axis (20) essentially corresponds to or lies flush with a face normal of the carrier plate (8) of the brake lining, and wherein said tool further comprises positive guiding means for moving the tool elements (68 to 71) in the direction of the second axis, wherein the positive guiding means are arranged between the compression plate (1) and the tool elements (68, 71), said positive guiding means comprising a wedge slider (64) and a guide slider (52) with corresponding slanted surfaces (65, 66) that are configured for a positively guided movement of the tool elements (68 to 71) in the direction of the first axis (20) and wherein the wedge slider (64) rests on the pressure plate (5) via a wedge piece (60), whereby wedge incline (62) of the wedge piece (60) corresponds to wedge incline (63) of the wedge slider (64).

15. A crimping device for creating protruding projections (18), such as teeth, burrs, crimps on a carrier plate (8) of a brake lining, comprising:
a tool that is driven by a compression plate (1) into the carrier plate (8) of the brake lining and subsequently removed from it again, said tool comprising a number of tool elements (68, 69, 70, 71) that can be adjusted in opposite directions relative to each other and that have cutting teeth, and wherein the tool elements (68 to 71) are moved in a plane both along a first axis (20) and a second axis (21) substantially perpendicular thereto to create protruding projections, wherein the first axis (20) essentially corresponds to or lies flush with a face normal of the carrier plate (8) of the brake lining, and wherein said tool further comprises positive guiding means for moving the tool elements (68 to 71) in the direction of the second axis, wherein the positive guiding means are arranged between the compression plate (1) and the tool elements (68, 71), said positive guiding means comprising a wedge slider (64) and a first guide slider (52) with corresponding slanted surfaces (65, 66) that are configured for a positively guided movement of the tool elements (68 to 71) in the direction of the first axis (20), and wherein the wedge slider (64) is pre-tensioned by means of a pressure spring (67) that rests on a second guide slider (51).

16. A crimping device for creating protruding projections (18), such as teeth, burrs, crimps on a carrier plate (8) of a brake lining, comprising:
a tool that is driven by a compression plate (1) into the carrier plate (8) of the brake lining and subsequently removed from it again, said tool comprising a number of tool elements (68, 69, 70, 71) that can be adjusted in opposite directions relative to each other and that have cutting teeth, and wherein the tool elements (68 to 71) are moved in a plane both along a first axis (20) and a second axis (21) substantially perpendicular thereto to create protruding projections, wherein the first axis (20) essentially corresponds to or lies flush with a face normal of the carrier plate (8) of the brake lining, and wherein said tool further comprises positive guiding means for moving the tool elements (68 to 71) in the direction of the second axis, wherein the positive guiding means are arranged between the compression plate (1) and the tool elements (68, 71), said positive guiding means comprising a wedge slider (64) and a first guide slider (52) with corresponding slanted surfaces (65, 66) that are configured for a positively guided movement of the tool elements (68 to 71) in the direction of the first axis (20), and wherein holding pins (76) are positioned in elongated holes (28) arranged at an angle relative to the first and/or second axes (20, 21), said elongated holes (28) being arranged in faceplates (81, 82) that are securely connected to the first guide slider (52) and a second guide slider (51).

* * * * *